US007631015B2

(12) United States Patent
Gupta et al.

(10) Patent No.: US 7,631,015 B2
(45) Date of Patent: Dec. 8, 2009

(54) INTERACTIVE PLAYLIST GENERATION USING ANNOTATIONS

(75) Inventors: Anoop Gupta, Woodinville, WA (US); David M. Bargeron, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 279 days.

(21) Appl. No.: 11/522,160

(22) Filed: Sep. 14, 2006

(65) Prior Publication Data

US 2007/0011206 A1    Jan. 11, 2007

Related U.S. Application Data

(63) Continuation of application No. 09/396,702, filed on Sep. 15, 1999, now Pat. No. 7,111,009, which is a continuation-in-part of application No. 08/818,804, filed on Mar. 14, 1997, now Pat. No. 6,006,241.

(51) Int. Cl.
*G06F 7/00* (2006.01)
*G06F 17/00* (2006.01)
*G06F 17/20* (2006.01)
*G06F 17/21* (2006.01)
*G06F 17/22* (2006.01)
*G06F 17/24* (2006.01)
*G06F 17/25* (2006.01)
*G06F 17/26* (2006.01)
*G06F 17/27* (2006.01)
*G06F 17/28* (2006.01)

(52) U.S. Cl. .................. 707/104.1; 707/102; 715/200; 715/230

(58) Field of Classification Search ............. 707/104.1, 707/102; 715/230, 200
See application file for complete search history.

(56) References Cited

U.S. PATENT DOCUMENTS

| 4,649,499 A | 3/1987 | Sutton et al. |
| 5,333,266 A | 7/1994 | Boaz et al. |

(Continued)

FOREIGN PATENT DOCUMENTS

EP       0650126       4/1995

(Continued)

OTHER PUBLICATIONS

"Integrated Video Archive Tools," Hjelsvold, Rune; Langorgen, Stein; Midtstraum, Roger; Sandsta, Olav, ACM Multimedia 95—Electronic Proceedings Nov. 5-9, 1995. Retrieved from http://delivery.acm.org/10.1145/220000/215282/p283-hjelsvold.htm?key1=215282&key2=5058389321&coll=ACM&dl=ACM&CFID=30530893&CFTOKEN=23543219 on Apr. 14, 2009.*

(Continued)

*Primary Examiner*—James Trujillo
*Assistant Examiner*—Bruce M Moser
(74) *Attorney, Agent, or Firm*—Perkins Coie LLP

(57) ABSTRACT

A plurality of user-selected annotations are used to define a playlist of media segments corresponding to the annotations. The user-selected annotations and their corresponding media segments are then provided to the user in a seamless manner. A user interface allows the user to alter the playlist and the order of annotations in the playlist. The user interface identifies each annotation by a short subject line.

20 Claims, 8 Drawing Sheets

U.S. PATENT DOCUMENTS

| | | | |
|---|---|---|---|
| 5,524,193 | A | 6/1996 | Covington et al. |
| 5,526,407 | A | 6/1996 | Russell et al. |
| 5,572,643 | A | 11/1996 | Judson |
| 5,583,980 | A | 12/1996 | Anderson |
| 5,600,775 | A * | 2/1997 | King et al. ............ 715/203 |
| 5,633,916 | A | 5/1997 | Goldhagen et al. |
| 5,699,089 | A | 12/1997 | Murray |
| 5,732,216 | A | 3/1998 | Logan et al. |
| 5,809,250 | A | 9/1998 | Kisor |
| 5,838,313 | A | 11/1998 | Hou et al. |
| 5,893,087 | A | 4/1999 | Wlaschin et al. |
| 5,893,110 | A | 4/1999 | Weber et al. |
| 5,903,892 | A | 5/1999 | Hoffert et al. |
| 5,923,848 | A | 7/1999 | Goodhand et al. |
| 5,969,716 | A | 10/1999 | Davis et al. |
| 5,991,365 | A | 11/1999 | Pizano et al. |
| 6,006,241 | A | 12/1999 | Purnaveia et al. |
| 6,009,462 | A | 12/1999 | Birrell et al. |
| 6,081,829 | A | 6/2000 | Sidana |
| 6,085,185 | A | 7/2000 | Matsuzawa et al. |
| 6,105,055 | A | 8/2000 | Pizano et al. |
| 6,144,375 | A | 11/2000 | Jain et al. |
| 6,173,287 | B1 | 1/2001 | Eberman et al. |
| 6,173,317 | B1 | 1/2001 | Chaddha et al. |
| 6,230,172 | B1 | 5/2001 | Purnaveja et al. |
| 6,311,189 | B1 | 10/2001 | deVries et al. |
| 6,317,141 | B1 | 11/2001 | Pavley et al. |
| 6,332,144 | B1 | 12/2001 | deVries et al. |
| 6,360,234 | B2 | 3/2002 | Jain et al. |
| 6,366,296 | B1 | 4/2002 | Boreczky et al. |
| 6,404,978 | B1 | 6/2002 | Abe et al. |
| 6,424,370 | B1 | 7/2002 | Courtney |
| 6,438,566 | B1 | 8/2002 | Okuno et al. |
| 6,449,653 | B2 | 9/2002 | Klemets et al. |
| 6,452,615 | B1 | 9/2002 | Chiu et al. |
| 6,452,875 | B1 | 9/2002 | Lee et al. |
| 6,484,156 | B1 | 11/2002 | Gupta et al. |
| 6,571,295 | B1 | 5/2003 | Sidana |
| 6,584,479 | B2 | 6/2003 | Chang et al. |
| 6,701,311 | B2 | 3/2004 | Biebesheimer et al. |
| 6,718,308 | B1 | 4/2004 | Nolting |
| 6,724,401 | B1 | 4/2004 | Hennum et al. |
| 6,833,865 | B1 | 12/2004 | Fuller et al. |
| 6,901,207 | B1 | 5/2005 | Watkins |
| 6,922,702 | B1 | 7/2005 | Jensen et al. |
| 6,956,593 | B1 | 10/2005 | Gupta et al. |
| 7,051,275 | B2 | 5/2006 | Gupta et al. |
| 7,111,009 | B1 | 9/2006 | Gupta et al. |
| 7,162,690 | B2 | 1/2007 | Gupta et al. |
| 2002/0069190 | A1 | 6/2002 | Geiselhart |
| 2002/0112004 | A1 | 8/2002 | Reid et al. |
| 2002/0118300 | A1 | 8/2002 | Middleton et al. |
| 2003/0078973 | A1 | 4/2003 | Przekop et al. |
| 2005/0081159 | A1 | 4/2005 | Gupta et al. |
| 2005/0160080 | A1 | 7/2005 | Dawson |
| 2005/0198006 | A1 | 9/2005 | Boicey et al. |
| 2005/0198193 | A1 | 9/2005 | Halme |
| 2005/0234885 | A1 | 10/2005 | Szeto et al. |
| 2006/0015904 | A1 | 1/2006 | Marcus |
| 2006/0026013 | A1 | 2/2006 | Kraft |
| 2007/0011206 | A1 | 1/2007 | Gupta et al. |
| 2007/0266304 | A1 | 11/2007 | Fletcher et al. |
| 2007/0276852 | A1 | 11/2007 | Fletcher |

FOREIGN PATENT DOCUMENTS

| | | | |
|---|---|---|---|
| EP | 0899737 | | 3/1999 |
| GB | 2254725 A | * | 10/1992 |
| GB | 2310260 | | 11/1996 |
| WO | WO 97/49251 | | 12/1997 |
| WO | WO-02/42864 | | 5/2002 |

OTHER PUBLICATIONS

"In re Lowry," 32 USPQ2d, U.S. Court of Appeals Federal Circuit, No. 93-1558, Decided Aug. 26, 1994, p. 1031-1035.

"Merriam Webster's Collegiate Dictionary," Tenth Edition, 1996, pp. 47, 55 and 56, 5 pages total.

"Some Frequently Asked Questions about RTP," archived Jun. 6, 1997, http://web.archive.org/web/19970607053036/http://www.cs.columbia.edu/~hgs/rtp/faq.html.

"Synchronized Multimedia Integration Language (SMIL) 1.0 Specification," W3C Recommendation, Jun. 15, 1998, http://www.w3.org/TR/REC-smil/.

"Webster's Encyclopedic Unabridged Dictionary of the English Language," 1989, Portland House, 3 pages.

"Webster's Seventh New Collegiate Dictionary", Reg. U.S. Pat. Off., 3 pages.

Booker, Ellis, "Microsoft and RealNetworks Wage Media War," techweb network, Jul. 10, 1998, http://www.techweb.com/wire/46802389.

Dumais, Susan et al., "Optimizing Search by Showing Results in Context," SIGCHI'01, Mar. 31-Apr. 4, 2001, Seattle, WA, pp. 277-284, © 2001 ACM, vol. No. 3, Issue No. 1.

Leake, David B. and Ryan Scherle, "Towards Context-Based Search Engine Selection," IUI'01, Jan. 14-17, 2001, Santa Fe, New Mexico, pp. 109-112, © 2001 ACM.

Nerney, Chris, "RealNetworks unveils software line for multimedia displays," NetworkWorld, May 4, 1998, http://www.nwfusion.com/news/0504real.html.

Pizano, Arturo et al., "Integrated Multimedia Messaging Concepts and Applications," Proceedings of the 1996 ACM Symposium on Applied Computing, Philadelphia, Pennsylvania, © 1996 ACM Press, pp. 12-16.

Pope, Arthur et al., "Video Abstraction: Summarizing Video Content for Retrieval and Visualization," In Proc. Thirty-Second Asilomar Conference on Signals, Systems & Computers, 1998, pp. 915-919.

Wei, Bin et al., "MediaAlert—A Broadcast Video Monitoring and Alerting System for Mobile Users," 3rd International Conference on Mobile Systems, Applications and Services, Seattle, WA, 2005, pp. 25-38, ACM.

"Mastering Microsoft Office 97," Mosely and Boodey, SYBEX, Inc., 1996, pp. 755-763 and pp. 811-816.

Abowd et al., "Teaching and Learning as Multimedia Authoring: The Classroom 2000 Project," Proceedings of the Multimedia '96, Boston, MA, USA, Nov 1996, ACM Press, pp. 187-198.

Bessler et al., "Diane: A Multimedia Annotation System," Proceedings of the ECMAST'97, Milan, Italy, May 1997.

Carrer et al., "An Annotation Engine for Supporting Video Database Population," Multimedia Tools and Applications 5, 1997, Kluwer Academic Publishers, pp. 233-258.

Chalfonte et al., "Expressive Richness: A Comparison of Speech and Text as Media for Revision," Proceedings of the CHI'91, 1991, ACM Press, pp. 21-26.

Chen et al., "Video and Audio: Organization and Retrieval in the WWW," Vosaic corporation, 1996, pp. 1-18.

Davis et al., "CoNote System Overview," 1995, Available at http://www.cs.cornell.edu/home/dph/annotation/annotations.html.

Gabbe, John D. et al., "Towards Intelligent Recognition of Multimedia Episodes in Real-Time Applications," 1994 ACM, pp. 227-236.

Gaines, Brian R et al., "Open Architecture Multimedia Documents," Proceedings of the Multimedia '93, Anaheim, CA, Aug. 1993, ACM Press, pp. 137-146.

Gould et al., "Relativity Controller: Reflecting User Perspective in Document Spaces," Adjunct Proceedings of INTERCHI'93, 1993, ACM Press, pp. 125-126.

Kim, Ki-Wook et al., "VIRON: An Annotation-Based Video Information Retrieval System," Proceedings of COMPSAC '96, Seoul, South Korea, Aug. 1996, © 1996 IEEE Press, pp. 298-303.

Laliberte et al., "A Protocol for Scalable Group and Public Annotations," 1997 NCA Technical Proposal, available at http://union.ncsa.uiuc.edu/~liberte/www/scalable-annotations.html.

Lawton et al., "The Knowledge Weasel Hypermedia Annotation System," Proceedings of the HyperText'93, Nov. 1993, ACM Press, pp. 106-117.

Lee, Suh-Yin et al., "Video Indexing—An Approach Based on Moving Object and Track," Proceedings of the SPIE, vol. 1908, Feb. 2-3, 1993, pp. 25-36.

Marshall, "Toward an Ecology of Hypertext Annotations," Proceedings of the Hypertext, Pittsburgh, PA, Jun. 1998, ACM Press, pp. 40-48.

Neuwirth et al., "Distributed Collaborative Writing: A Comparison of Spoken and Written Modalities for Reviewing and Revising Documents," Proceedings of the CHI'94, Boston, MA, Apr. 1994, ACM Press, pp. 51-57.

Phelps et al., "Multivalent Annotations," Proceedings of the First European Conference on Research and Advanced Technology for Digital Libraries, Pisa, Italy, Sep. 1997.

Roscheisen et al., "Beyond Browsing: Shared Comments, SOAPs, Trails, and On-Line Communities," Computer Networks and ISDN Systems 27, 1995, pp. 739-749.

Roscheisen et al., "Shared Web Annotations as a Platform for Third-Party Value-Added, Information Providers: Architecture, Protocols, and Usage Examples," Technical Report, CSDTR/DLTR 1997, Stanford University, Available at http://www.diglib.stanford.edu/rmr/TR/TR.html.

Schickler et al., "Pan-Browser Support for Annotations and Other Meta Information on the World Wide Web," Proceedings of the Fifth International World Wide Web Conference, Paris, France, May 1996, available at http://www5conf.inria.fr/fich_html/papers/p15/Overview.html.

Smith et al., "What Should a Wildebeest Say? Interactive Nature Films for High School Classrooms," Proceedings of the ACM Multimedia '97, Seattle, WA, Nov. 1997, ACM Press, pp. 193-201.

Smith, MacKenzie, "DynaText: An Electronic Publishing System," Computers and the Humanities, vol. 27, 1993-1994, Technical Review, pp. 415-420.

Stanford Online: Masters in Electrical Engineering, http://scpd.stanford.edu/cee/telecom/onlinedegree.html [last accessed Nov. 3, 2000].

Weber, Karon et al., "Marquee: A Tool for Real-Time Video Logging," Proceedings of CHI '94, Boston, MA, Apr. 1994, © 1994 ACM Press, pp. 58-64.

Wei, S.X., "MediaWeaver—A Distributed Media Authoring System for Networked Scholarly Workspaces," Multimedia Tools and Applications 6, 1998, Kluwer Academic Publishers, pp. 97-111.

* cited by examiner

Annotation Entry 180

| Author 182 |
| --- |
| Time Range 184 |
| Time Units 186 |
| Creation Time 188 |
| Title 190 |
| Content 192 |
| Annotation Identifier 194 |
| Related Annotation Identifier 196 |
| Set Identifier(s) 198 |
| Media Content Identifier 200 |
| Property Fields 202 |
| Sequence Number 204 |

*Fig. 4*

INTERACTIVE PLAYLIST GENERATION USING ANNOTATIONS

CROSS-REFERENCE TO RELATED APPLICATION

This application is a continuation of U.S. patent application Ser. No. 09/396,702, filed Sep. 15, 1999, now U.S. Pat. No. 7,111,009 issued Sep. 19, 2006, which is a continuation-in-part of U.S. patent application Ser. No. 08/818,804, filed Mar. 14, 1997, entitled "Production of a Video Stream with Synchronized Annotations Over a Computer Network," now U.S. Pat. No. 6,006,241 issued Dec. 21, 1999. Additionally, this application claims the benefit of U.S. Provisional Application No. 60/100,452, filed Sep. 15, 1998, entitled "Annotations for Streaming Video on the Web: System Design and Usage," to Anoop Gupta and David M. Bargeroni. These applications listed are incorporated herein by reference.

TECHNICAL FIELD

This invention relates to networked client/server systems and to methods of delivering and rendering multimedia content in such systems. More particularly, the invention relates to systems and methods of selecting and providing such content.

BACKGROUND OF THE INVENTION

The advent of computers and their continued technological advancement has revolutionized the manner in which people work and live. An example of such is in the education field, wherein educational presentations (such as college lectures, workplace training sessions, etc.) can be provided to a computer user as multimedia data (e.g., video, audio, text, and/or animation data). Today, such presentations are primarily video and audio, but a richer, broader digital media era is emerging. Educational multimedia presentations provide many benefits, such as allowing the presentation data to be created at a single time yet be presented to different users at different times and in different locations throughout the world.

These multimedia presentations are provided to a user as synchronized media. Synchronized media means multiple media objects that share a common timeline. Video and audio are examples of synchronized media-each is a separate data stream with its own data structure, but the two data streams are played back in synchronization with each other. Virtually any media type can have a timeline. For example, an image object can change like an animated .gif file, text can change and move, and animation and digital effects can happen over time. This concept of synchronizing multiple media types is gaining greater meaning and currency with the emergence of more sophisticated media composition frameworks implied by MPEG-4, Dynamic HTML, and other media playback environments.

The term "streaming" is used to indicate that the data representing the various media types is provided over a network to a client computer on a real-time, as-needed basis, rather than being pre-delivered in its entirety before playback. Thus, the client computer renders streaming data as it is received from a network server, rather than waiting for an entire "file" to be delivered.

Multimedia presentations may also include "annotations" relating to the multimedia presentation. An annotation is data (e.g., audio, text, video, etc.) that corresponds to a multimedia presentation. Annotations can be added by anyone with appropriate access rights to the annotation system (e.g., the lecturer/trainer or any of the students/trainees). These annotations typically correspond to a particular temporal location in the multimedia presentation and can provide a replacement for much of the "in-person" interaction and "classroom discussion" that is lost when the presentation is not made "in-person" or "live". As part of an annotation, a student can comment on a particular point, to which another student (or lecturer) can respond in a subsequent annotation. This process can continue, allowing a "classroom discussion" to occur via these annotations. Additionally, some systems allow a user to select a particular one of these annotations and begin playback of the presentation starting at approximately the point in the presentation to which the annotation corresponds.

However, current systems typically allow a user to select multimedia playback based only on individual annotations. This limitation provides a cumbersome process for the user, as he or she may wish to view several different portions of the presentation corresponding to several different annotations. Using current systems, the user would be required to undergo the painstaking process of selecting a first annotation, viewing/listening to the multimedia presentation corresponding to the first annotation, selecting a second annotation, viewing/listening to the multimedia presentation corresponding to the second annotation, selecting a third annotation, viewing/listening to the multimedia presentation corresponding to the third annotation, and so on through several annotations.

The invention described below addresses this and other disadvantages of annotations, providing a way to improve multimedia presentation using annotations.

SUMMARY OF THE INVENTION

Annotations correspond to media segments of one or more multimedia streams. A playlist generation interface is presented to the user in the form of annotation titles or summaries for a group of annotations. This group of annotations corresponds to the media segments that are part of a playlist. The playlist can then be altered by the user to suit his or her desires or needs by interacting with the annotation title/summary interface. The media segments of the playlist can then be presented to the user in a seamless, contiguous manner.

According to one aspect of the invention, the ordering of the annotation titles/summaries can be altered by the user, resulting in a corresponding change in order of presentation of the media segments. The ordering of the annotation titles/summaries can be changed by moving the titles or summaries in a drag and drop manner.

According to another aspect of the invention, the media segments of the playlist can themselves be stored as an additional multimedia stream. This additional multimedia stream can then be annotated in the same manner as other multimedia streams.

BRIEF DESCRIPTION OF THE DRAWINGS

FIG. 4 is a block diagram illustrating the structure for an annotation according to one embodiment of the invention.

DETAILED DESCRIPTION

General Network Structure

Figure 1:
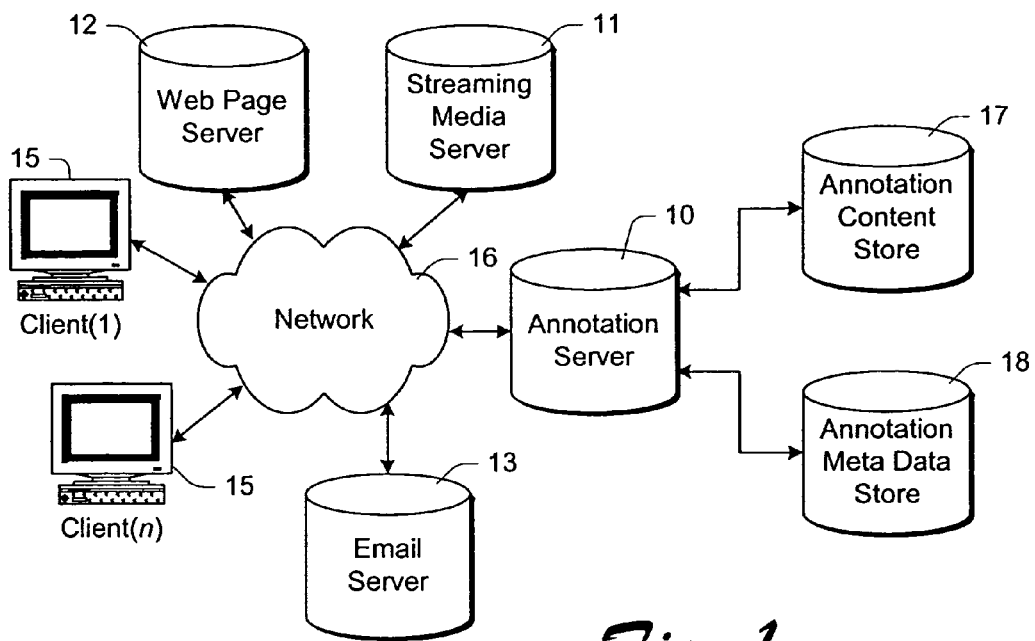
FIG. 1 shows a client/server network system and environment in accordance with one embodiment of the invention.

FIG. 1 shows a client/server network system and environment in accordance with one embodiment of the invention. Generally, the system includes multiple network server computers 10, 11, 12, and 13, and multiple (n) network client computers 15. The computers communicate with each other over a data communications network. The communications network in FIG. 1 comprises a public network 16 such as the Internet. The data communications network might also include, either in addition to or in place of the Internet, local-area networks and/or private wide-area networks.

Streaming media server computer 11 has access to streaming media content in the form of different media streams. These media streams can be individual media streams (e.g., audio, video, graphical, etc.), or alternatively can be composite media streams including two or more of such individual streams. Some media streams might be stored as files in a database or other file storage system, while other media streams might be supplied to the server on a "live" basis from other data source components through dedicated communications channels or through the Internet itself.

There are various standards for streaming media content and composite media streams. The "Advanced Streaming Format" (ASF) is an example of such a standard, including both accepted versions of the standard and proposed standards for future adoption. ASF specifies the way in which multimedia content is stored, streamed, and presented by the tools, servers, and clients of various multimedia vendors. Further details about ASF are available from Microsoft Corporation of Redmond, Wash.

Annotation server 10 controls the storage of annotations and their provision to client computers 15. The annotation server 10 manages the annotation meta data store 18 and the annotation content store 17. The annotation server 10 communicates with the client computers 15 via any of a wide variety of known protocols, such as the Hypertext Transfer Protocol (HTTP). The annotation server 10 can receive and provide annotations via direct contact with a client computer 15, or alternatively via electronic mail (email) via email server 13. The annotation server 10 similarly communicates with the email server 13 via any of a wide variety of known protocols, such as the Simple Mail Transfer Protocol (SMTP).

The annotations managed by annotation server 10 correspond to the streaming media available from media server computer 11. In the discussions to follow, the annotations are discussed as corresponding to streaming media. However, it should be noted that the annotations can similarly correspond to "pre-delivered" rather than streaming media, such as media previously stored at the client computers 15 via the network 16, via removable magnetic or optical disks, etc.

When a user of a client computer 15 accesses a web page containing streaming media, a conventional web browser of the client computer 15 contacts the web server 12 to get the Hypertext Markup Language (HTML) page, the media server 11 to get the streaming data, and the annotation server 10 to get any annotations associated with that media. When a user of a client computer 15 desires to add or retrieve annotations, the client computer 15 contacts the annotation server 10 to perform the desired addition/retrieval.

Exemplary Computer Environment

In the discussion below, the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, mini-computers, mainframe computers, and the like. In a distributed computer environment, program modules may be located in both local and remote memory storage devices.

Figure 2:
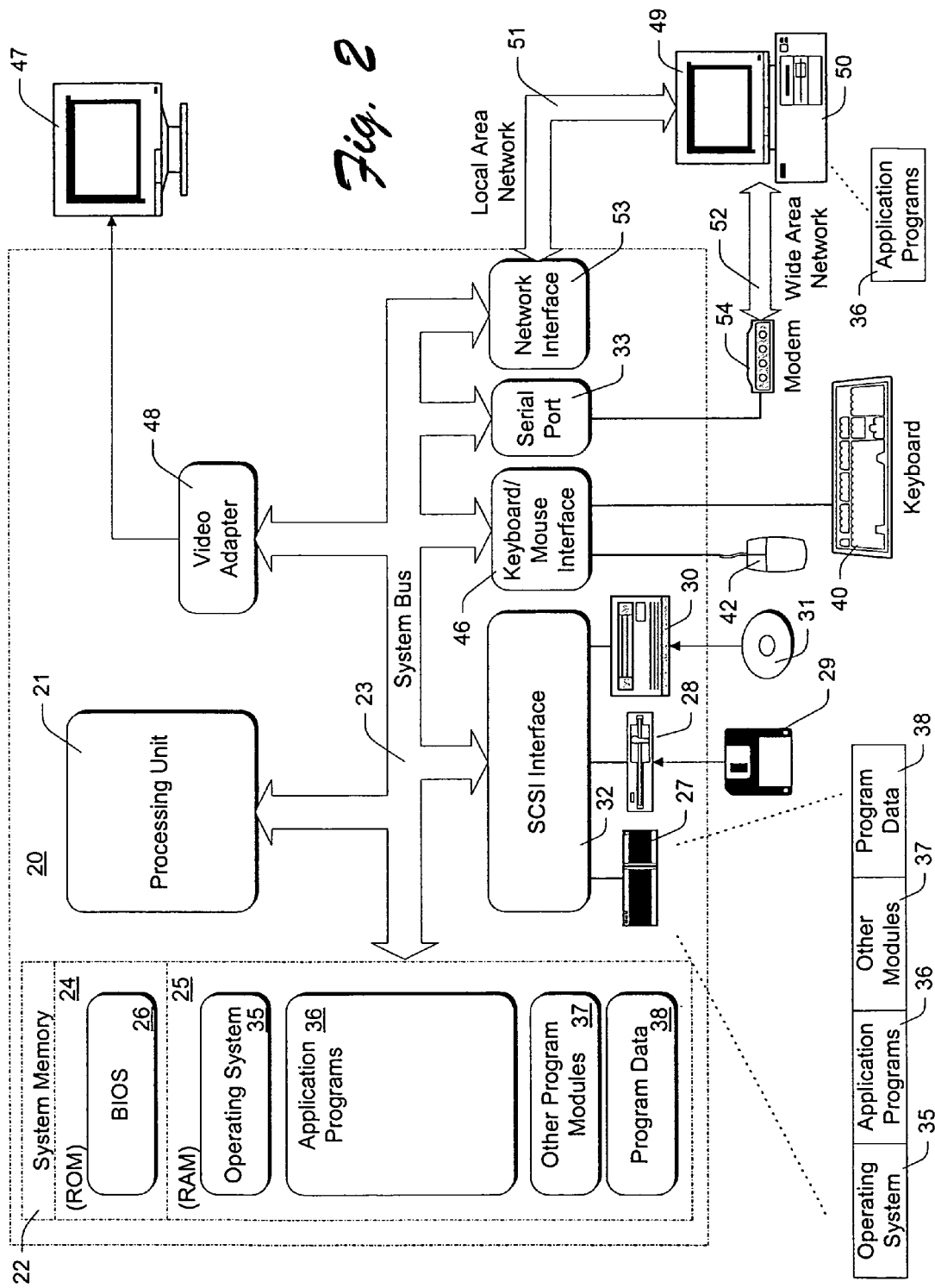
FIG. 2 shows a general example of a computer that can be used as a client or server in accordance with the invention.

FIG. 2 shows a general example of a computer 20 that can be used as a client or server in accordance with the invention. Computer 20 is shown as an example of a computer that can perform the functions of any of server computers 10-13 or a client computer 15 of FIG. 1.

Computer 20 includes one or more processors or processing units 21, a system memory 22, and a bus 23 that couples various system components including the system memory 22 to processors 21.

The bus 23 represents one or more of any of several types of bus structures, including a memory bus or memory controller, a peripheral bus, an accelerated graphics port, and a processor or local bus using any of a variety of bus architectures. The system memory includes read only memory (ROM) 24 and random access memory (RAM) 25. A basic input/output system (BIOS) 26, containing the basic routines that help to transfer information between elements within computer 20, such as during start-up, is stored in ROM 24. Computer 20 further includes a hard disk drive 27 for reading from and writing to a hard disk, not shown, a magnetic disk drive 28 for reading from and writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by an SCSI interface 32 or some other appropriate interface. The drives and their associated computer-readable media provide nonvolatile storage of computer readable instructions, data structures, program modules and other data for computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into computer 20 through input devices such as keyboard 40 and pointing device 42. Other input devices (not shown) may include a microphone, joystick, game pad, satellite dish, scanner, or the like. These and other input devices are connected to the processing unit 21 through an interface 46 that is coupled to the system bus. A monitor 47 or other type of display device is also connected to the system bus 23 via an interface, such as a video adapter 48. In addition to the monitor, personal computers typically include other peripheral output devices (not shown) such as speakers and printers.

Computer 20 operates in a networked environment using logical connections to one or more remote computers, such as a remote computer 49. The remote computer 49 may be another personal computer, a server, a router, a network PC, a peer device or other common network node, and typically includes many or all of the elements described above relative to computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets, and the Internet. In the described embodiment of the invention, remote computer 49 executes an Internet Web browser program such as the "Internet Explorer" Web browser manufactured and distributed by Microsoft Corporation of Redmond, Washington.

When used in a LAN networking environment, computer 20 is connected to the local network 51 through a network interface or adapter 53. When used in a WAN networking environment, computer 20 typically includes a modem 54 or other means for establishing communications over the wide area network 52, such as the Internet. The modem 54, which may be internal or external, is connected to the system bus 23 via a serial port interface 33. In a networked environment, program modules depicted relative to the personal computer 20, or portions thereof, may be stored in the remote memory storage device. It will be appreciated that the network connections shown are exemplary and other means of establishing a communications link between the computers may be used.

Generally, the data processors of computer 20 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Client/Server Relationship

Figure 3:
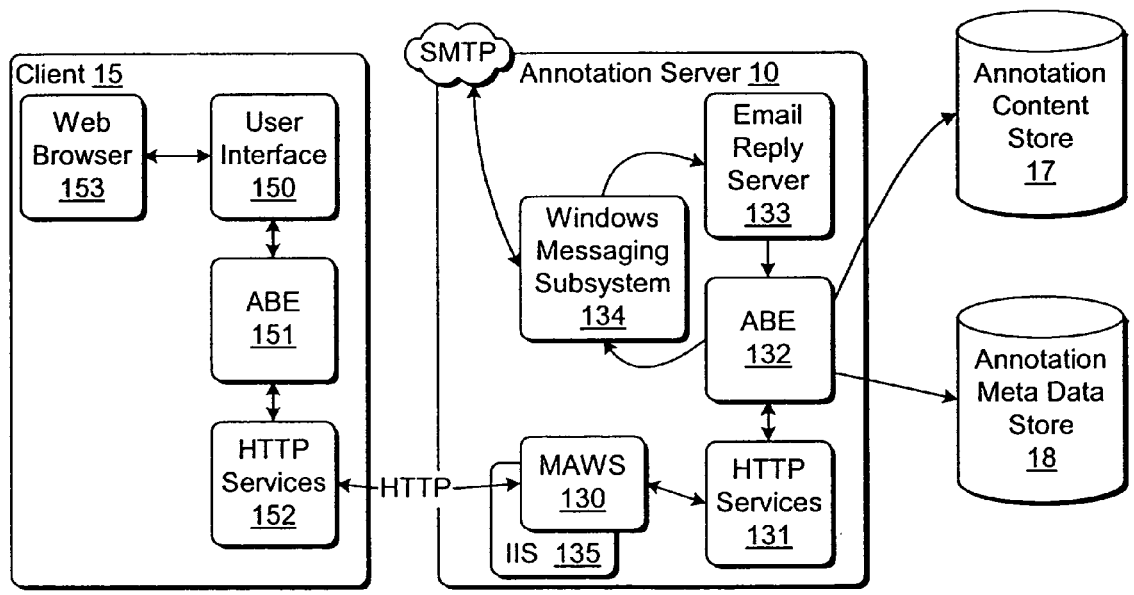
FIG. 3 is a block diagram illustrating an annotation server and a client computer in more detail in accordance with one embodiment of the invention.

FIG. 3 illustrates an annotation server and a client computer in more detail. As noted above, generally, commands are formulated at client computer 15 and forwarded to annotation server 10 via HTTP requests. In the illustrated embodiment of FIG. 3, communication between client 15 and server 10 is performed via HTTP, using commands encoded as Uniform Resource Locators (URLs) and data formatted as object linking and embedding (OLE) structured storage documents, or alternatively using Extensible Markup Language (XML).

Client 15 includes an HTTP services (HttpSvcs) module 152, which manages communication with server 10, and an annotation back end (ABE) module 151, which translates user actions into commands destined for server 10. A user interface (MMA) module 150 provides the user interface (UI) for a user to add and select different annotations, and be presented with the annotations. According to one implementation, the user interface module 150 supports ActiveX controls that display an annotation interface for streaming video on the Web.

Client 15 also includes a web browser module 153, which provides a conventional web browsing interface and capabilities for the user to access various servers via network 16 of FIG. 1. Web browser 153 also provides the interface for a user to be presented with media streams. In addition to the use of playlists discussed below, the user can select which one of different versions of multimedia content he or she wishes to receive from media server 11 of FIG. 1. This selection can be direct (e.g., entry of a particular URL or selection of a "low resolution" option), or indirect (e.g., entry of a particular desired playback duration or an indication of system capabilities, such as "slow system" or "fast system"). Alternatively, other media presentation interfaces could be used.

Annotation server 10 includes the Multimedia Annotation Web Server (MAWS) module 130, which is an Internet Services Application Programming Interface (ISAPI) plug-in for Internet Information Server (IIS) module 135. Together, these two modules provide the web server functionality of annotation server 10. Annotation server 10 also includes an HTTP Services module 131 which manages communication with client 15. In addition, annotation server 10 utilizes The Windows Messaging Subsystem 134 to facilitate communication with email server 13 of FIG. 1, and an email reply server 133 for processing incoming email received from email server 13.

Annotation server 10 further includes an annotation back end (ABE) module 132, which contains functionality for accessing annotation stores 17 and 18, for composing outgoing email based on annotation data, and for processing incoming email. Incoming email is received and passed to the ABE module 132 by the Email Reply Server 133. Annotation content authored at client 15, using user interface 150, is received by ABE 132 and maintained in annotation content store 17. Received meta data (control information) corresponding to the annotation content is maintained in annotation meta data store 18. The annotation content and meta data can be stored in any of a variety of conventional manners, such as in SQL relational databases (e.g., using Microsoft "SQL Server" version 7.0, available from Microsoft Corporation). Annotation server 10 is illustrated in FIG. 3 as maintaining the annotation content and associated control information (meta data) separately in two different stores. Alternatively, all of the annotation data (content and meta information) can be stored together in a single store, or content may be stored by another distinct storage system on the network 16 of FIG. 1, such as a file system, media server, email server, or other data store.

ABE 132 of annotation server 10 also manages the interactive generation and presentation of streaming media data from server computer 11 of FIG. 1 using "playlists". A "playlist" is a listing of one or more multimedia segments to be retrieved and presented in a given order. Each of the multimedia segments in the playlist is defined by a source identifier, a start time, and an end time. The source identifier identifies which media stream the segment is part of, the start time identifies the temporal location within the media stream where the segment begins, and the end time identifies the temporal location within the media stream where the segment ends.

ABE 132 allows playlists to be generated interactively based on annotations maintained in annotation stores 17 and 18. ABE 132 provides a user at client 15 with multiple possible annotation identifiers (e.g., titles or summaries) from which the user can select those of interest to him or her. Based on the selected annotations, ABE 132 coordinates provision of the associated media segments to the user. ABE 132 can directly communicate with video server computer 11 to identify which segments are to be provided, or alternatively can provide the appropriate information to the browser of client computer 15, which in turn can request the media segments from server computer 11.

FIG. 4 shows an exemplary structure for an annotation entry 180 that is maintained by annotation server 10 in annotation meta data store 18 of FIG. 3. In the illustrated embodiment, an annotation entry 180 includes an author field 182, a time range field 184, a time units field 186, a creation time field 188, a title field 190, a content field 192, an identifier field 194, a related annotation identifier field 196, a set identifier(s) field 198, a media content identifier field 200, an arbitrary number of user-defined property fields 202, and a sequence number 204. Each of fields 182-204 is a collection of data which define a particular characteristic of annotation entry 180. Annotation entry 180 is maintained by annotation server 10 of FIG. 3 in annotation meta data store 18. Content field 192, as discussed in more detail below, includes a pointer to (or other identifier of) the annotation content, which in turn is stored in annotation content store 17.

Author field 182 contains data identifying the user who created annotation entry 180 and who is therefore the author of the annotation. The author is identified by ABE 151 of FIG. 3 based on the user logged into client 15 at the time the annotation is created.

Time range field 184 contains data representing "begin" and "end" times defining a segment of media timeline to which annotation entry 180 is associated. Time units field 186 contains data representing the units of time represented in time range field 184. Together, time range field 184 and time units field 186 identify the relative time range of the annotation represented by annotation entry 180. This relative time range corresponds to a particular segment of the media stream to which annotation entry 180 is associated. The begin and end times for the annotation are provided by the user via interface 150 of FIG. 3, or alternatively can be automatically or implicitly derived using a variety of audio and video signal processing techniques, such as sentence detection in audio streams or video object tracking.

It should be noted that the time ranges for different annotations can overlap. Thus, for example, a first annotation may correspond to a segment ranging between the first and fourth minutes of media content, a second annotation may correspond to a segment ranging between the second and seventh minutes of the media content, and a third annotation may correspond to a segment ranging between the second and third minutes of the media content.

Alternatively, rather than using the presentation timeline of the media content, different media characteristics can be used to associate the annotation with a particular segment(s) of the media content. For example, annotations could be associated with (or "anchored" on) specific objects in the video content, or specific events in the audio content.

Creation time field 188 contains data specifying the date and time at which annotation entry 180 is created. It should be noted that the time of creation of annotation entry 180 is absolute and is not relative to the video or audio content of the media stream to which annotation entry 180 is associated. Accordingly, a user can specify that annotations which are particularly old, e.g., created more than two weeks earlier, are not to be displayed. ABE 132 of FIG. 3 stores the creation time and date when the annotation is created.

Title field 190 contains data representing a title by which the annotation represented by annotation entry 180 is identified. The title is generally determined by the user and the user enters the data representing the title using conventional and well known user interface techniques. The data can be as simple as ASCII text or as complex as HTML code which can include text having different fonts and type styles, graphics including wallpaper, motion video images, audio, and links to other multimedia documents.

Content field 192 contains data representing the substantive content of the annotation as authored by the user. The actual data can be stored in content field 192, or alternatively content field 192 may store a pointer to (or other indicator of) the content that is stored separately from the entry 180 itself. In the illustrated example, content field 192 includes a pointer to (or other identifier of) the annotation content, which in turn is stored in annotation content store 17. The user enters the data representing the content using conventional and well known user interface techniques. The content added by the user in creating annotation entry 180 can include any one or more of text, graphics, video, audio, etc. or links thereto. In essence, content field 192 contains data representing the substantive content the user wishes to include with the presentation of the corresponding media stream at the relative time range represented by time range field 184 and time units field 186.

Annotation identifier field 194 stores data that uniquely identifies annotation entry 180, while related annotation identifier field 196 stores data that uniquely identifies a related annotation. Annotation identifier field 194 can be used by other annotation entries to associate such other annotation entries with annotation entry 180. In this way, threads of discussion can develop in which a second annotation responds to a first annotation, a third annotation responds to the second annotation and so on. By way of example, an identifier of the first annotation would be stored in related annotation identifier field 196 of the second annotation, an identifier of the second annotation would be stored in related annotation identifier field 196 of the third annotation, and so on.

Set identifier(s) field 198 stores data that identifies a particular one or more sets to which annotation entry 180 belongs. A media stream can have multiple sets of annotations, sets can span multiple media content, and a particular annotation can correspond to one or more of these sets. Which set(s) an annotation belongs to is identified by the author of the annotation. By way of example, a media stream corresponding to a lecture may include the following sets: "instructor's comments", "assistant's comments", "audio comments", "text comments", "student questions", and each student's personal comments.

Media content identifier field 200 contains data that uniquely identifies particular multimedia content as the content to which annotation entry 180 corresponds. Media content identifier 200 can identify a single media stream (either an individual stream or a composite stream), or alternatively identify multiple different streams that are different versions of the same media content. Media content identifier 200 can identify media versions in a variety of different manners. According to one embodiment, the data represents a real-time transport protocol (RTP) address of the different media streams. An RTP address is a type of uniform resource locator (URL) by which multimedia documents can be identified in a network. According to an alternate embodiment, a unique identifier is assigned to the content rather than to the individual media streams. According to another alternate embodiment, a different unique identifier of the media streams could be created by annotation server 10 of FIG. 3 and assigned to the media streams. Such a unique identifier would also be used by streaming media server 11 of FIG. 1 to identify the media streams. According to another alternate embodiment, a uniform resource name (URN) such as those described by K. Sollins and L. Mosinter in "Functional Requirements for Uniform Resource Names," IETF RFC 1733 (December 1994) could be used to identify the media stream.

User-defined property fields 202 are one or more user-definable fields that allow users (or user interface designers) to customize the annotation system. Examples of such additional property fields include a "reference URL" property which contains the URL of a web page used as reference material for the content of the annotation; a "help URL" property containing the URL of a help page which can be accessed concerning the content of the annotation; a "view script" property containing JavaScript which is to be executed whenever the annotation is viewed; a "display type" property, which gives the client user interface information about how the annotation is to be displayed; etc.

Sequence number 204 allows a user to define (via user interface 150 of FIG. 3) a custom ordering for the display of annotation identifiers, as discussed in more detail below. Sequence number 204 stores the relative position of the annotations with respect to one another in the custom ordering, allowing the custom ordering to be saved for future used. In the illustrated example, annotation entry 180 stores a single sequence number. Alternatively, multiple sequence numbers 204 may be included in annotation entry 180 each corresponding to a different custom ordering, or a different annotation set, or a different user, etc.

Figure 5:
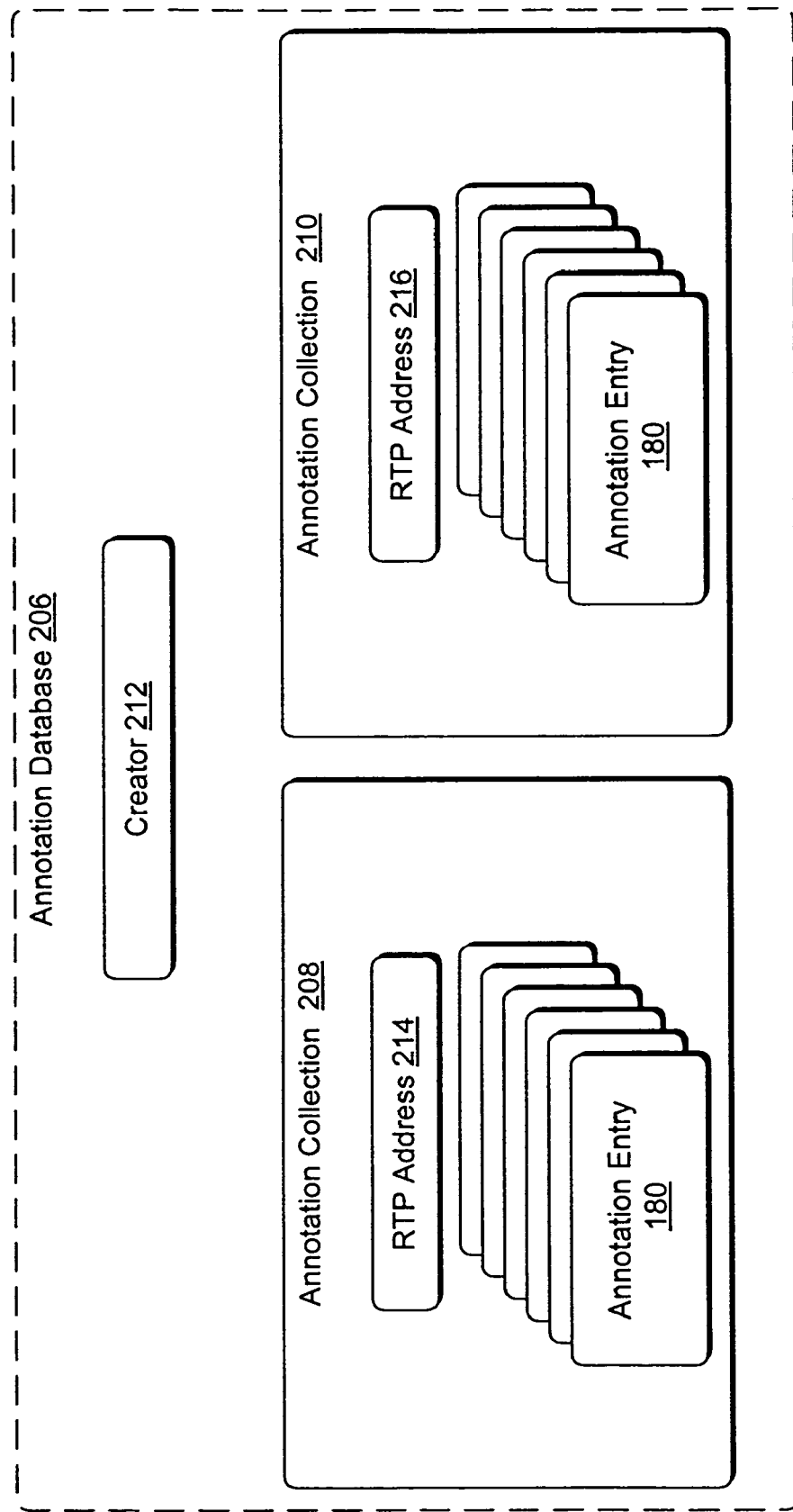
FIG. 5 is a block diagram illustrating exemplary annotation collections.

FIG. 5 illustrates exemplary implicit annotation collections for annotations maintained by annotation server 10 of FIG. 3. A collection of annotations refers to annotation entries 180 of FIG. 4 that correspond to the same media stream(s), based on the media content identifier 200. Annotation entries 180 can be viewed conceptually as part of the same annotation collection if they have the same media content identifiers 200, even though the annotation entries may not be physically stored together by annotation server 10.

Annotation database 206 includes two annotation collections 208 and 210. Annotation server 10 dynamically adds, deletes, and modifies annotation entries in annotation database 206 based on commands from client 15. Annotation entries can be created and added to annotation database 206 at any time a user cares to comment upon the content of the stream (or another annotation) in the form of an annotation. Annotation server 10 forms an annotation entry from identification data, content data, title data, and author data of an "add annotation" request received from the client's ABE 151 (FIG. 3), and adds the annotation entry to annotation database 206.

Annotation database 206 includes a fields 212, 214, and 216 that specify common characteristics of all annotation entries of database 206 or an annotation collection 208 or 210. Alternatively, fields 212-216 can be included redundantly in each annotation entry 180.

Creator field 212 contains data identifying the user who was responsible for creating annotation database 206.

RTP address fields 214 and 216 contain data representing an RTP address of the media stream (e.g., the RTP address of the stream identified in media content identifier 200 of FIG. 5) for the annotation collection. An RTP address provides an alternative mechanism, in addition to the data in identifier field 200, for associating the media stream with annotation entries 180. In alternative embodiments, RTP address fields 214 and 216 need not be included, particularly embodiments in which media content identifier 200 contains the RTP address of the media stream.

User Interface

An annotation can be created by a user of any of the client computers 15 of FIG. 1. As discussed above with reference to FIG. 3, client 15 includes an interface module 150 that presents an interface to a user (e.g., a graphical user interface), allowing a user to make requests of annotation server 10. In the illustrated embodiment, a user can access annotation server 10 via an annotation toolbar provided by interface 150.

Figure 6:
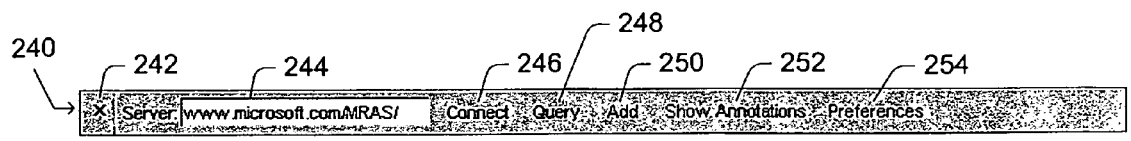
FIG. 6 illustrates an annotation toolbar in accordance with one embodiment of the invention.

FIG. 6 illustrates an annotation toolbar in accordance with one embodiment of the invention. Annotation toolbar 240 includes various identifying information and user-selectable options 242-254.

Selection of an exit or "X" button 242 causes interface 150 to terminate display of the toolbar 240. A server identifier 244 identifies the annotation server with which client 15 is currently configured to communicate (annotation server 10 of FIG. 1. in the illustrated embodiment).

Selection of a connection button 246 causes ABE 151 of FIG. 3 to establish a connection with the annotation server identified by identifier 244. Selection of a query button 248 causes interface module 150 to open a "query" dialog box, from which a user can search for particular annotations. Selection of an add button 250 causes interface module 150 to open an "add new annotation" dialog box, from which a user can create a new annotation.

Selection of a show annotations button 252 causes interface module 150 to open a "view annotations" dialog box, from which a user can select particular annotations for presentation.

Selection of a preferences button 254 causes interface 150 of FIG. 3 to open a "preferences" dialog box, from which a user can specify various UI preferences, such as an automatic server query refresh interval, or default query criteria values to be persisted between sessions.

Annotation Creation

Figure 7:
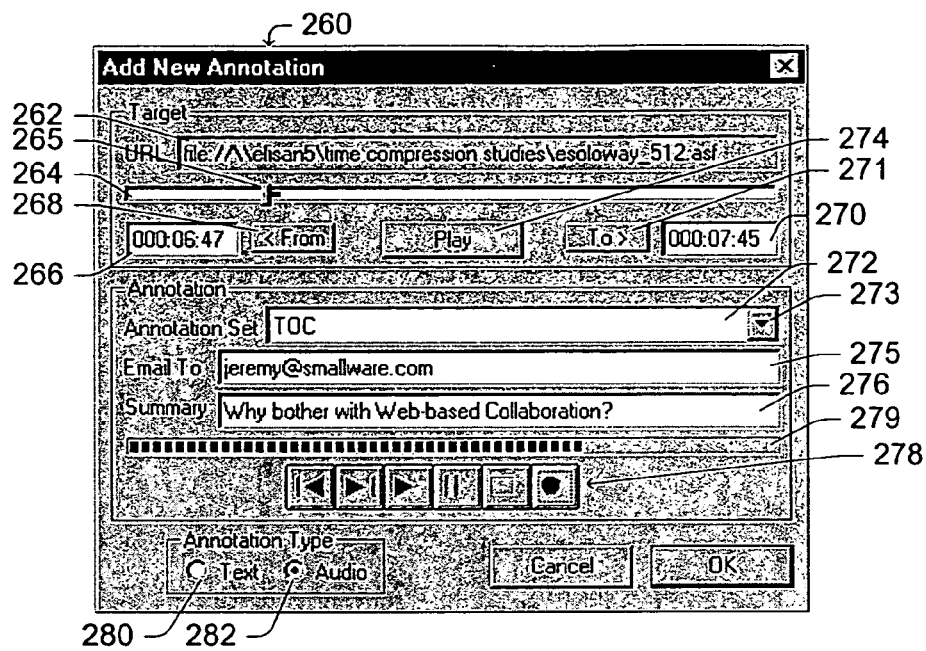
FIG. 7 illustrates an "add new annotation" dialog box in accordance with one embodiment of the invention.

FIG. 7 shows an "add new annotation" dialog box 260 that results from user selection of add button 250 of FIG. 6 to create a new annotation. Interface 150 assumes that the current media stream being presented to the user is the media stream to which this new annotation will be associated. The media stream to which an annotation is associated is referred to as the "target" of the annotation. An identifier of this stream is displayed in a target specification area 262 of dialog box 260. Alternatively, a user could change the target of the annotation, such as by typing in a new identifier in target area 262, or by selection of a "browse" button (not shown) that allows the user to browse through different directories of media streams.

A time strip 264 is also provided as part of dialog box 260. Time strip 264 represents the entire presentation time of the corresponding media stream. A thumb 265 that moves within time strip 264 indicates a particular temporal position within the media stream. The annotation being created via dialog box 260 has a begin time and an end time, which together define a particular segment of the media stream. When "from" button 268 is selected, thumb 265 represents the begin time for the segment relative to the media stream. When "to" button 271 is selected, thumb 265 represents the end time for the segment relative to the media stream. Alternatively, two different thumbs could be displayed, one for the begin time and one for the end time. The begin and end times are also displayed in an hours/minutes/seconds format in boxes 266 and 270, respectively.

Thumb 265 can be moved along time strip 264 in any of a variety of conventional manners. For example, a user can depress a button of a mouse (or other cursor control device) while a pointer is "on top" of thumb 265 and move the pointer along time strip 264, causing thumb 265 to move along with the pointer; The appropriate begin or end time is then set when the mouse button is released. Alternatively, the begin and end times can be set by entering (e.g., via an alphanumeric keyboard) particular times in boxes 266 and 270.

Dialog box 260 also includes a "play" button 274. Selection of play button 274 causes interface module 150 of FIG. 3 to forward a segment specification to web browser 153 of client 15. The segment specification includes the target identifier from target display 262 and the begin and end times from boxes 266 and 270, respectively. Upon receipt of the segment specification from interface module 150, the browser communicates with media server 11 and requests the identified media segment using conventional HTTP requests. In response, media server 11 streams the media segment to client 15 for presentation to the user. This presentation allows, for example, the user to verify the portion of the media stream to which his or her annotation will correspond.

Dialog box 260 also includes an annotation set identifier 272, an email field 275, and a summary 276. Annotation set identifier 272 allows the user to identify a named set to which the new annotation will belong. This set can be a previously defined set, or a new set being created by the user. Selection of the particular set can be made from a drop-down menu activated by selection of a button 273, or alternatively can be directly input by the user (e.g., typed in using an alphanumeric keyboard). According to one embodiment of the invention, annotation server 10 of FIG. 3 supports read and write access controls, allowing the creator of the set to identify which users are able to read and/or write to the annotation set. In this embodiment, only those sets for which the user has write access can be entered as set identifier 272.

Email identifier 275 allows the user to input the email address of a recipient of the annotation. When an email address is included, the newly created annotation is electronically mailed to the recipient indicated in identifier 275 in addition to being added to the annotation database. Furthermore, the recipient of the electronic mail message can reply to the message to create an additional annotation. To enable this, the original email message is configured with annotation server 10 as the sender. Because of this, a "reply to sender" request from the recipient will cause an email reply to be sent to annotation server 10. Upon receipt of such an electronic mail message reply, annotation server 10 creates a new annotation and uses the reply message content as the content of the new annotation. This new annotation identifies, as a related annotation, the original annotation that was created when the original mail message was sent by annotation server 10. In the illustrated embodiment, this related annotation identifier is stored in field 196 of FIG. 4.

Summary 276 allows the user to provide a short summary or title of the annotation content. Although the summary is illustrated as being text, it could include any of a wide variety of characters, alphanumerics, graphics, etc. In the illustrated embodiment, summary 276 is stored in the title field 190 of the annotation entry of FIG. 4.

Dialog box 260 further includes radio buttons 280 and 282, which allow an annotation to be created as text and/or audio. Although not shown, other types of annotations could also be accommodated, such as graphics, HTML documents, etc. Input controls 278 are also provided as part of dialog box. The illustrated controls are enabled when the annotation includes audio data. Input controls 278 include conventional audio control buttons such as fast forward, rewind, play, pause, stop and record. Additionally, an audio display bar 279 can be included to provide visual progress feedback when the audio is playing or recording.

The exact nature of input controls 278 is dependent on the type of annotation content being provided. In the case of text content, input controls 278 may simply include a box into which text can be input by the user via an alphanumeric keyboard. Additionally, a keyboard layout may also be provided to the user, allowing him or her to "point and click" using a mouse and pointer to select particular characters for entry.

Annotation and Media Segment Retrieval

Figure 8:
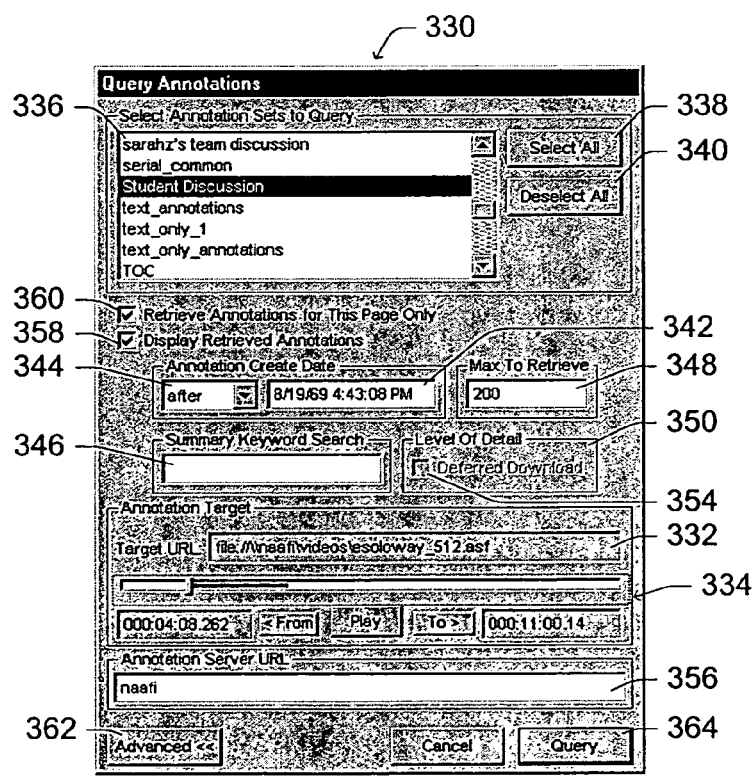
FIG. 8 illustrates a "query annotations" dialog box in accordance with one embodiment of the invention.

FIG. 8 shows a "query annotations" dialog box 330 that results from a user selecting query button 248 of FIG. 6. Many of the options presented to the user in dialog box 330 are similar to those presented in the "add new annotation" dialog box 260 of FIG. 7, however, those in dialog box 330 are used as search criteria rather than data for a new annotation.

Dialog box 330 includes a target display 332 that contains an identifier of the target stream. This identifier can be input in any of a variety of manners, such as by typing in a new identifier in target display 332, or by selection of a "browse" button (not shown) that allows the user to browse through different directories of media streams. In the illustrated embodiment, the identifier is an URL. However, alternate embodiments can use different identifier formats.

Dialog box 330 also includes target information 334, which includes a time strip, thumb, "from" button, "to" button, "play" button, and begin and end times, which are analogous to the time strip, thumb, "from" button, "to" button, "play" button, begin and end times of dialog box 260 of FIG. 7. The begin and end times in target information 334 limit the query for annotations to only those annotations having a time range that corresponds to at least part of the media segment between the begin and end times of target information 334.

Dialog box 330 also includes an annotation set list 336. Annotation set list 336 includes a listing of the various sets that correspond to the target media stream. According to one implementation, only those sets for which an annotation has been created are displayed in set list 336. According to one embodiment of the invention, annotation server 10 of FIG. 3 supports read and write security, allowing the creator of the set to identify which users are able to read and/or write to the annotation set. In this embodiment, only those sets for which the user has read access are displayed in set list 336.

A user can select sets from annotation set list 336 in a variety of manners. For example, using a mouse and pointer to "click" on a set in list 336, which highlights the set to provide feedback to the user that the set has been selected. Clicking on the selected set again de-selects the set (leaving it no longer highlighted). Additionally, a "select all" button 338 allows a user to select all sets in set list 336, while a "deselect all" button 340 allows a user to de-select all sets in set list 336.

In the illustrated embodiment, the sets displayed as part of annotation set list 336 contain annotations which correspond to the target identifier in target display 332. However, in alternate embodiments the sets in selection list 338 need not necessarily contain annotations which correspond to the target identifier in target display 332. Interface module 150 allows a user to select different target streams during the querying process. Thus, a user may identify a first target stream and select one or more sets to query annotations from for the first target stream, and then identify a second target stream and select one or more sets to query annotations from for the second target stream.

Additional search criteria can also be input by the user. As illustrated, a particular creation date and time identifier 342 can be input, along with a relation 344 (e.g., "after" or "before"). Similarly, particular words, phrases, characters, graphics, etc. that must appear in the summary can be input in a summary keyword search identifier 346. A maximum number of annotations to retrieve in response to the query can also be included as a max identifier 348. Furthermore, the query can be limited to only annotations that correspond to the target identifier in target display 332 by selecting check box 360.

A level of detail 350 to retrieve can also be selected by the user. Examples of different levels that could be retrieved include the "full level" (that is, all content of the annotation), or a "deferred download" where only an identifier of the annotations (e.g., a summary or title) is downloaded. In the illustrated example, selection of checkbox 354 selects the deferred download level, whereas if checkbox 354 is not selected then the full level of detail is implicitly selected.

A server identifier 356 identifies the annotation server with which client 15 is currently configured to communicate. Different annotation servers can be selected by the user by inputting the appropriate identifier as server identifier 356. This input can be provided in any of a variety of manners, such as by typing in a new identifier in server identifier 356 or by selection of a "browse" button (not shown) that allows the user to browse through different directories of annotation servers.

A user can request automatic display of the retrieved annotations by selecting a "display retrieved annotations" checkbox 358. Selection of "advanced" button 362 reduces the number of options available to the user, simplifying dialog box 330. For example, the simplified dialog box may not include fields 342, 344, 348, 346, 350, 332, 334, or 336.

The user can then complete the query process by selecting a query button 364. Upon selection of the query button 364, interface 150 closes the query dialog box 330 and forwards the search criteria to annotation server 10. Additionally, if checkbox 358 is selected then interface 150 displays a "view annotations" dialog box 400 of FIG. 9. Alternatively, a user can provide a view request, causing interface 150 to display dialog box 400, by selecting show annotations button 252 in annotation toolbar 240 of FIG. 6.

Figure 9:
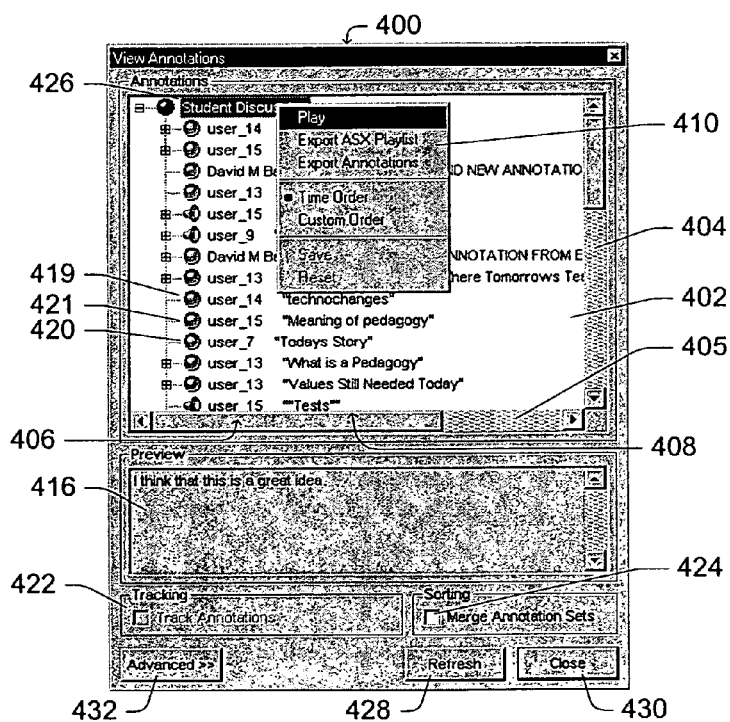
FIG. 9 illustrates a "view annotations" dialog box in accordance with one embodiment of the invention.

FIG. 9 shows a dialog box 400 that identifies annotations corresponding to a playlist of media segments. The playlist is a result of the query input by the user as discussed above with reference to FIG. 8. In the illustration of FIG. 9, annotation identifiers in the form of user identifiers 406 and summaries 408 are displayed within an annotation listing box 402. The user can scroll through annotation identifiers in a conventional manner via scroll bars 404 and 405. The annotation identifiers are presented in annotation listing box 402 according to a default criteria, such as chronological by creation time/date, by user, alphabetical by summaries, etc.

Related annotations are displayed in an annotation listing 402 in a hierarchical, horizontally offset manner. The identifier of an annotation that is related to a previous annotation is "indented" from that previous annotation's identifier and a connecting line between the two identifiers is shown.

Figure 10:
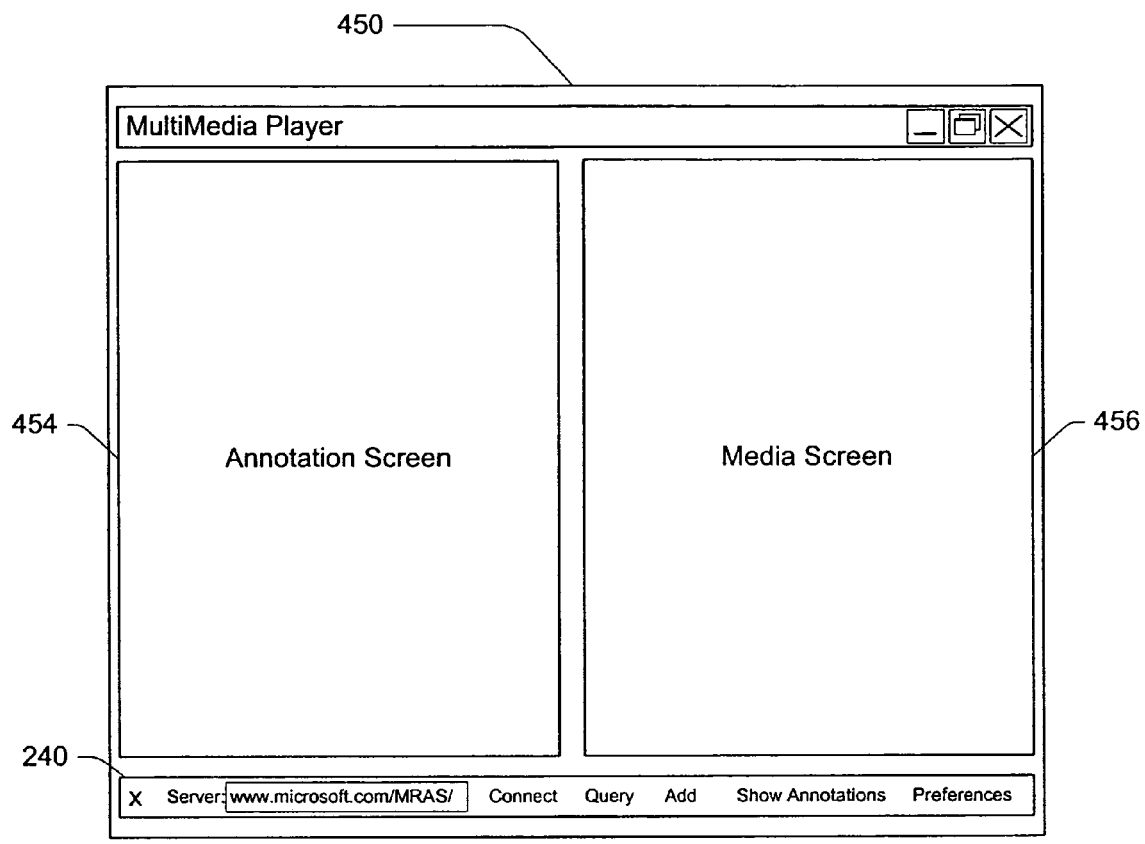
FIG. 10 is a diagrammatic illustration of a graphical user interface window displaying annotations and corresponding media segments concurrently in accordance with one embodiment of the invention.

Dialog box 400 can be displayed concurrently with a multimedia player that is presenting multimedia content that corresponds to the annotations in annotation listing 402 (e.g., as illustrated in FIG. 10 below). Interface module 150 can have the annotations "track" the corresponding multimedia content being played back, so that the user is presented with an indication (e.g., an arrow) as to which annotation(s) correspond to the current temporal position of the multimedia content. Such tracking can be enabled by selecting checkbox 422, or disabled by de-selecting checkbox 422.

Dialog box 400 also includes a merge annotation sets checkbox 424. Selection of merge annotation sets checkbox 424 causes interface module 150 to present annotation identifiers in listing box 402 in a chronological order regardless of what set(s) the annotations in annotation listing 402 belong to. If checkbox 424 is not selected, then annotations from different sets are grouped and displayed together in annotation listing 402 (e.g., under the same tree item). Thus, when checkbox 424 is not selected, interface 150 displays one playlist for each annotation set that has been retrieved from annotation server 10.

Dialog box 400 also includes a refresh button 428, a close button 430, and an advanced button 432. Selection of refresh button 428 causes interface module 150 to communicate with annotation back end 151 to access annotation server 10 and obtain any additional annotations that correspond to the query that resulted in listing box 402.

Selection of close button 430 causes interface 150 to terminate the display of dialog box 400. Selection of advanced button 432 causes interface 150 to display a different view annotations box having additional details, such as annotation target information (analogous to target display 332 discussed below with reference to FIG. 8), user-selectable preferences for information displayed as annotation identifiers in listing box 402, etc.

Upon user selection of a particular annotation identifier from listing box 402 (e.g., "single clicking" on the summary), preview information is presented in a preview section 416, and a selection box or menu 410 is provided. The exact nature of the preview information is dependent on the data type and amount of information that was requested (e.g., as identified in level of detail 350 of FIG. 8).

Menu 410 includes the following options: play, export ASX playlist, export annotations, time order, custom order, save, and reset. Selection of the "play" option causes playback of the multimedia content to begin starting with the selected annotation in annotation list 402. Selection of the "export ASX playlist" option causes annotation backend 151 to output a record (e.g., create a file) that identifies the temporal segments of multimedia content that the annotations identified in list 402 correspond to, as determined by the begin and end times of the annotations. Selection of the "export annotations" option causes annotation backend 151 to output a record (e.g., create a file) that includes the annotation content of each annotation identified in list 402.

Selection of the "time order" option causes interface module 150 to display the identifiers in list 402 in chronological order based on the begin time for each annotation. Selection of the "custom order" option allows the user to identify some other criteria to be used in determining the order of the identifiers in list 402 (e.g., identifiers can be re-ordered in a conventional drag and drop manner). Re-ordering annotation identifiers causes the sequence numbers 204 (of FIG. 4) of the annotations to be re-ordered accordingly. Selection of the "save" option causes interface module 150 to save the current custom ordering to annotation server 10 of FIG. 3 by saving the current sequence numbers of the annotations. Selection of the "reset" option causes interface module 150 to ignore any changes that have been made since the last saved custom ordering and revert to the last saved custom ordering.

Transfer of the corresponding media segments (and/or the annotations) to client 15 is initiated when the "play" option of menu 410 is selected. Upon selection of the play option, interface 150 of FIG. 3 provides the list of annotation identifiers being displayed to web browser 153 (or other multimedia presentation application) in the order of their display, including the target identifier and temporal range information. Thus, web browser 153 receives a list of multimedia segments that it is to present to the user in a particular order. Web browser 153 then accesses media server 11 to stream the multimedia segments to client 15 for presentation in that order. By use of the play option in menu 410, a user is able to review the information regarding the annotations that satisfy his or her search criteria and then modify the annotation playlist (e.g., by deleting or reordering annotation identifiers) before the corresponding media segments (and/or the annotations) are presented to him or her.

Alternatively, transfer of the media segments may be initiated in other manners rather than by selection of the play option in menu 410. For example, a "start" button may be included as part of dialog box 400, selection of which initiates transfer of the media segments to client 15.

The annotations and/or corresponding media segments are presented to the user "back to back" with very little or no noticeable gap between different annotations and between different segments. Thus, the presentation of the annotations and/or media segments is "seamless".

A user is able to reorder the media segments of the playlist and thereby alter their order of presentation. In the illustrated embodiment, media segments are reordered by changing the ordering of the annotation identifiers in annotation listing 402 in a drag and drop manner. For example, using a mouse and pointer a user can select a particular annotation identifier (e.g., identifier 420) and drag it to a different location within the dialog box (e.g., between identifiers 419 and 421), thereby changing when the media segment corresponding to the annotation identified by identifier 420 is presented relative to the other annotations.

As discussed above, information regarding the media stream as well as the particular media segment within that stream to which an annotation corresponds is maintained in each annotation. At the appropriate time, web browser 153 sends a message to the appropriate media server 11 of FIG. 1 to begin streaming the appropriate segment to client computer 15. Web browser 153, knowing the duration of each of the segments being provided to client computer 15, forwards additional messages to media server 11 to continue with the provision of the next segment, according to the playlist, when appropriate. By managing the delivery of the media segments to client computer 15 in such a manner, web browser 153 can keep the media segments being provided to the user in a seamless manner.

According to an alternate embodiment, the media segments could be streamed to annotation server 10 for temporary buffering and subsequent streaming to client computer 15. According to another alternate embodiment, identifying information (e.g., source, start time, and end time) for the media segment could be provided to media server 11 from annotation server 10 for streaming to client computer 15.

Additionally, according to one embodiment the collection of media segments identified by the playlist can be stored as an additional media stream by selecting "export ASF playlist" option in menu 410 of FIG. 9. By saving the collection of media segments as a single media stream, the collection can be retrieved by the user (or other users) at a later time without having to go through another querying process. Furthermore, the collection of segments, stored as a media stream, can itself be annotated.

The collection of segments can be stored as a media stream in any of a variety of different locations and formats. The media stream can be stored in an additional data store (not shown) managed by annotation server 10 of FIG. 3, or alternatively stored at media server 11 of FIG. 1 or another media server (not shown) of FIG. 1. According to one embodiment, the media stream includes the source information, start time, and end time for each of the segments in the playlist. Thus, little storage space is required and the identifying information for each of the segments is independent of the annotations. Alternatively, the media stream includes pointers to each of the annotations. For subsequent retrieval of the media segments, the stored pointers can be used to retrieve each of the appropriate annotations, from which the corresponding media segments can be retrieved. According to another alternate embodiment, the media segments themselves could be copied from media server 11 of FIG. 1 and those segments stored as the media stream.

FIG. 10 shows one implementation of a graphical user interface window 450 that concurrently displays annotations and corresponding media segments. This UI window 450 has an annotation screen 454, a media screen 456, and a toolbar 240.

Media screen 456 is the region of the UI within which the multimedia content is rendered. For video content, the video is displayed on screen 456. For non-visual content, screen 456 displays static or dynamic images representing the content. For audio content, for example, a dynamically changing frequency wave that represents an audio signal is displayed in media screen 456.

Annotation screen 454 is the region of the UI within which the annotation identifiers and/or annotation content are rendered. For example, dialog box 400 of FIG. 9 can be annotation screen 454.

Figure 11:
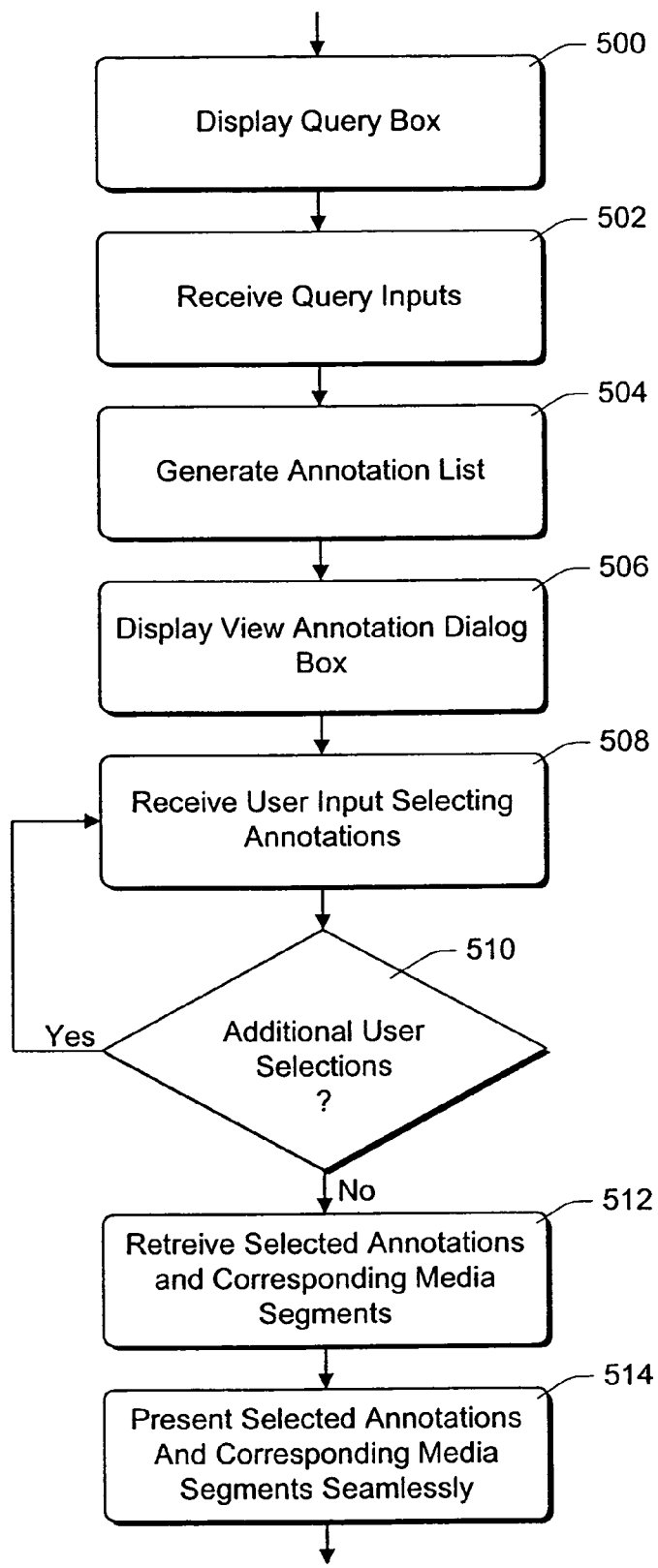
FIG. 11 illustrates methodological aspects of one embodiment of the invention in retrieving and presenting annotations and media segments to a user.

FIG. 11 illustrates methodological aspects of one embodiment of the invention in retrieving and presenting annotations and media segments to a user.

A step 500 comprises displaying a query dialog box 330 of FIG. 8. Interface 150 of FIG. 3 provides dialog box 330 in response to a query request from a user, allowing the user to search for annotations that satisfy various user-definable criteria.

A step 502 comprises receiving query input from the user. Interface 150 of FIG. 3 receives the user's input(s) to the query dialog box and provides the inputs to annotation server 10 of FIG. 3.

A step 504 comprises generating an annotation list. ABE 132 of FIG. 3 uses the user inputs to the query dialog box to select annotations from stores 17 and 18. ABE 132 searches through annotation meta data store 18 for the annotations that satisfy the criteria provided by the user. The annotations that satisfy that criteria then become part of the annotation list and identifying information, such as the annotation titles or summaries, are provided to client 15 by annotation server 10.

A step 506 comprises displaying a view annotations dialog box 400 of FIG. 9 that contains the annotation identifying information from the annotation list generated in step 504.

Steps 508 and 510 comprise receiving user input selecting various annotations from the identifying information displayed in step 506. Steps 508 and 510 repeat until the user has finished his or her selecting.

A step 512 comprises retrieving the selected annotations and corresponding media segments. ABE 132 in annotation server 10 of FIG. 3 is responsible for retrieving the selected annotations from stores 17 and 18.

A step 514 comprises presenting the selected annotations and corresponding media segments to the user in a seamless manner.

In the illustrated embodiment, both the selected annotations as well as the corresponding media segments are provided to the user. In one alternate embodiment, only the media segments corresponding to the annotations (and not the annotations themselves) are provided to the user. In another alternate embodiment only the annotations (and not the corresponding segments of the media stream) are provided to the user. In another embodiment, the annotations are downloaded to the client computer first, and the media segments are downloaded to the client computer later in an on-demand manner.

In the illustrated embodiment, annotation data is buffered in annotation server 10 of FIG. 1 for provision to client 15 and media stream data is buffered in media server 11 for provision to client 15. Sufficient buffering is provided to allow the annotation and media stream data to be provided to the client seamlessly. For example, when streaming two media segments to client 15, as the end of the first media segment draws near media server 11 is working on obtaining and streaming the beginning of the second media segment to client 15. By doing so, there is little or no noticeable gap between the first and second media segments as presented to the user. Alternatively, rather than providing such buffering in the servers 10 and 11, additional buffering can be provided by client 15 to allow the seamless presentation of the data.

CONCLUSION

The invention described above provides interactive playlist generation using annotations. Annotations correspond to media segments of one or more multimedia streams. Identifiers of the annotations can be presented to a user and their order advantageously changed by the user to suit his or her desires. These annotation identifiers correspond to a playlist of media segments. The media segments (and/or the annotations themselves) of the playlist are then advantageously presented to the user in a seamless, contiguous manner.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer-readable storage media containing a computer program for annotating a media stream, the media stream having segments with a first order of presentation defined when the media stream is recorded, wherein the program performs steps comprising:
creating annotations interactively with a user, wherein the annotations correspond to identified segments of the media stream, wherein the media stream corresponds to a single presentation including one video stream and wherein each identified segment of the media stream includes a segment of the one video stream and has a begin time and an end time relative to the media stream;
graphically ordering the annotations in a user's desired order of presentation in response to input from the user; and
in response to a user instruction,
sequentially presenting the annotations corresponding to the identified segments in the desired order of presentation, and
sequentially presenting the segments of the media stream in an order of presentation defined by the desired order of presentation of the annotations corresponding to the identified segments of the media stream so that the media stream segments are presented in an order of presentation that is different from the first order of presentation
wherein the annotations and their corresponding identified segments are displayed concurrently and wherein different users can specify different desired orders of presentation by ordering the annotations.

2. One or more computer-readable media as recited in claim 1, wherein the annotations comprise textual annotations.

3. One or more computer-readable media as recited in claim 1, wherein the segments comprises audio/visual video segments.

4. One or more computer-readable media as recited in claim 1, the steps further comprising storing the annotations and their desired order of presentation.

5. One or more computer-readable media as recited in claim 1, the steps further comprising:
storing the annotations and their desired order of presentation; and
in response to a user request,
retrieving the stored annotations and their desired order of presentation,
displaying the retrieved annotations in their desired order of presentation, and
retrieving and presenting the media stream segments identified by the retrieved annotations, in sequential order in accordance with the desired order of presentation of the retrieved annotations.

6. A method performed by a computer system having a processor and a memory, the method comprising:
receiving an indication of a plurality of annotations selected by a user, wherein each of the plurality of annotations corresponds to a segment of a single media stream, wherein each segment of the single media stream has a begin time and an end time relative to the single media stream;
presenting a plurality of annotation identifiers to the user, the plurality of annotation identifiers having an ordering;
allowing the ordering of the plurality of annotation identifiers to be changed by the user;
seamlessly providing one or more of,
the plurality of annotations, and
at least a portion of the segment of the media stream corresponding to each of the plurality of annotations;
wherein the seamlessly providing comprises seamlessly providing the plurality of annotations and the portion of the segment of the media stream corresponding to each of the plurality of annotations in an order defined by the changed ordering of the plurality of annotation identifiers wherein the receiving, presenting, and providing are performed by the processor executing instructions stored in the memory.

7. A method as recited in claim 6, further comprising: allowing the user to change the ordering of the plurality of annotation identifiers in a drag and drop manner.

8. A method as recited in claim 6 wherein the ordering of the plurality of annotation identifiers is changed by the user prior to providing the one or more of the plurality of annotations and the portion of the media stream corresponding to each of the plurality of annotations.

9. The method of claim 6 wherein the single media stream has a begin time corresponding to the begin time of the segment of the single media stream with the earliest begin time and wherein the single media stream has an end time corresponding to the end time of the segment of the single media stream with the latest end time.

10. A method performed by a computer system having a processor and a memory, the method comprising:

graphically ordering annotations in a first desired order of presentation in response to user input from a first user, wherein the annotations correspond to identified segments of a media stream wherein the media stream is created by recording a single multimedia presentation and wherein the media stream includes a single video stream and a single audio stream wherein the single video stream and the single audio stream are synchronized;

graphically ordering annotations in a second desired order of presentation in response to user input from a second user, wherein the annotations correspond to identified segments of the media stream, each identified segment including a segment of the single video stream and a segment of the single audio stream wherein the segment of the single video stream and the segment of the single audio stream are synchronized;

in response to a single user instruction, sequentially presenting to the first user the annotations concurrently with their corresponding identified media stream segments in the first desired order of presentation; and in response to a single user instruction, sequentially presenting to the second user the annotations concurrently with their corresponding identified media stream segments in the second desired order of presentation wherein the media stream has a chronological order of presentation and wherein the first desired order of presentation and the second desired order of presentation are each different from the chronological order of presentation and each other wherein the ordering and presenting are performed by the processor executing instructions stored in the memory.

11. A method as recited in claim 10, wherein:
the annotations are textual annotations;
the media streams are audio/visual video streams; and
the presenting comprises displaying the textual annotations in one display area while displaying the corresponding segments of the audio/visual streams in another display area.

12. A method as recited in claim 10, further comprising storing the annotations and the desired order of presentation.

13. A method as recited in claim 12, further comprising:
in response to a user request,
retrieving the stored annotations and a desired order of presentation,
displaying the retrieved annotations in the retrieved desired order of presentation, and
retrieving and presenting the media stream segments identified by the retrieved annotations, in sequential order in accordance with the retrieved desired order of presentation.

14. A computing system having a processor and a memory, the computing system comprising:

an annotation creating component for creating annotations interactively with a user, wherein the annotations correspond to identified segments of one or more media streams having a p re-defined order of presentation wherein each of the identified segments has a begin time and an end time relative to the media stream associated with that segment;

an annotation ordering component for graphically ordering the annotations in a desired order of presentation in response to user input, wherein the desired order of presentation differs from the pre-defined order of presentation; and a presentation component for, in response to a single user instruction, sequentially presenting the annotations concurrently with their corresponding identified media stream segments in the desired order of presentation wherein the components are stored in the memory for execution by the processor.

15. A system as recited in claim 14, wherein:
the annotations are textual annotations;
the media streams are audio/visual video streams; and
the presenting comprises displaying the textual annotations in one display area while displaying the corresponding segments of the audio/visual streams in another display area.

16. A system as recited in claim 14, further comprising storing the annotations and the desired order of presentation.

17. A system as recited in claim 14, further comprising:
a component that stores the annotations and their desired order of presentation; and
in response to a user request,
retrieves the stored annotations and the desired order of presentation,
displays the retrieved annotations in the desired order of presentation, and
retrieves and presents the media stream segments identified by the retrieved annotations, in sequential order in accordance with the desired order of presentation of the retrieved annotations.

18. A method performed by a computer system having a processor and a memory for presenting segments of a media stream to a user, the method comprising:

providing a media stream that includes video and audio portions;

providing textual annotations for the media stream, each annotation corresponding to a segment of the media stream and having a begin time and an end time wherein the begin time and end time for an annotation are automatically derived by processing an audio portion of the media stream;

receiving a query input by a user, the query including a word;

identifying annotations matching the received query;

providing a display page for displaying the identified annotations to the user;

receiving a selection made by the user of a displayed annotation; and providing for presenting to the user the segment of the media stream corresponding to the selected annotation wherein the providing, receiving, and identifying are performed by the processor executing instructions stored in the memory.

19. The method of claim 18 wherein automatically deriving a begin time and end time for the annotation includes detecting sentences within the audio stream.

20. The method of claim 18 wherein presenting to the user the one or more segments of the media stream includes streaming the segments to a user via a web browser.

* * * * *

UNITED STATES PATENT AND TRADEMARK OFFICE
CERTIFICATE OF CORRECTION

| | | |
|---|---|---|
| PATENT NO. | : 7,631,015 B2 | Page 1 of 1 |
| APPLICATION NO. | : 11/522160 | |
| DATED | : December 8, 2009 | |
| INVENTOR(S) | : Anoop Gupta et al. | |

It is certified that error appears in the above-identified patent and that said Letters Patent is hereby corrected as shown below:

In column 1, line 4, delete "APPLICATION" and insert -- APPLICATIONS --, therefor.

In column 1, line 15, delete "Bargeroni." and insert -- Bargeron. --, therefor.

In column 20, line 4, in Claim 13, delete "annotations," and insert -- annotations --, therefor.

In column 20, line 12, in Claim 14, delete "p re-defined" and insert -- pre-defined --, therefor.

In column 20, line 12, in Claim 14, delete "presentation" and insert -- presentation, --, therefor.

Signed and Sealed this
Eighth Day of February, 2011

David J. Kappos
*Director of the United States Patent and Trademark Office*